United States Patent
Chiang et al.

(10) Patent No.: US 11,364,690 B2
(45) Date of Patent: Jun. 21, 2022

(54) RESIN-BASED COMPOSITE STRUCTURE AND METHOD FOR FORMING RESIN-BASED COMPOSITE STRUCTURE

(71) Applicant: GIANT MANUFACTURING CO., LTD., Taichung (TW)

(72) Inventors: Yao-Tun Chiang, Taichung (TW); Chih-Kai Chang, Taichung (TW); Ching-Yao Lin, Taichung (TW)

(73) Assignee: GIANT MANUFACTURING CO., LTD., Taichung (TW)

( * ) Notice: Subject to any disclaimer, the term of this patent is extended or adjusted under 35 U.S.C. 154(b) by 558 days.

(21) Appl. No.: 16/261,605

(22) Filed: Jan. 30, 2019

(65) Prior Publication Data
US 2019/0240928 A1      Aug. 8, 2019

Related U.S. Application Data

(60) Provisional application No. 62/628,255, filed on Feb. 8, 2018.

(51) Int. Cl.
*B29C 70/34*      (2006.01)
*B32B 27/08*      (2006.01)
(Continued)

(52) U.S. Cl.
CPC .......... *B29C 70/34* (2013.01); *B29C 63/0017* (2013.01); *B29C 70/021* (2013.01); *B29C 70/086* (2013.01); *B29C 70/42* (2013.01); *B32B 5/022* (2013.01); *B32B 5/024* (2013.01); *B32B 27/08* (2013.01); *B32B 27/12* (2013.01);
(Continued)

(58) Field of Classification Search
CPC . B29C 63/0017; B29C 70/021; B29C 70/086; B29C 70/34; B29C 70/42; B29L 2031/3091; C08J 5/24; B32B 2262/106; B32B 2605/00; B32B 27/08; B32B 27/12; B32B 27/28; B32B 27/285; B32B 27/286;
(Continued)

(56) References Cited

U.S. PATENT DOCUMENTS 10,501,618 B2 * 12/2019 Ishimoto ............ C08G 59/3227
2012/0115990 A1    5/2012 Wang et al.
(Continued)

FOREIGN PATENT DOCUMENTS

CN    100421924 C    10/2008
CN    102227308 A    10/2011
(Continued)

*Primary Examiner* — Arti Singh-Pandey
(74) *Attorney, Agent, or Firm* — CKC & Partners Co., LLC

(57) ABSTRACT

A method for forming a resin-based composite structure is provided. The method includes: providing a prepreg layup, wherein the prepreg layup includes an epoxy resin-carbon fiber composite material; covering a thermal-fusion material on a surface of the prepreg layup; and performing a molding and curing process to fuse the thermal-fusion material with the prepreg layup. Wherein the molding and curing process includes: heating at a first temperature to melt, soften and fully fuse the thermal-fusion material with the prepreg layup; and heating at a second temperature to solidify the thermal-fusion material for forming the resin-based composite structure. Wherein the first temperature is lower than the second temperature.

18 Claims, 10 Drawing Sheets

(51) Int. Cl.
  *B32B 27/34* (2006.01)
  *B32B 27/28* (2006.01)
  *B32B 27/38* (2006.01)
  *B29C 70/02* (2006.01)
  *B29C 70/08* (2006.01)
  *B29C 70/42* (2006.01)
  *B29C 63/00* (2006.01)
  *C08J 5/24* (2006.01)
  *B29L 31/30* (2006.01)
  *B32B 5/02* (2006.01)
  *B32B 27/12* (2006.01)

(52) U.S. Cl.
  CPC ............ *B32B 27/28* (2013.01); *B32B 27/285* (2013.01); *B32B 27/286* (2013.01); *B32B 27/34* (2013.01); *B32B 27/38* (2013.01); *C08J 5/24* (2013.01); *B29L 2031/3091* (2013.01); *B32B 2262/106* (2013.01); *B32B 2605/00* (2013.01)

(58) Field of Classification Search
  CPC ......... B32B 27/34; B32B 27/38; B32B 5/022; B32B 5/024
  See application file for complete search history.

(56) References Cited

U.S. PATENT DOCUMENTS

| | | | |
|---|---|---|---|
| 2018/0057645 A1* | 3/2018 | Oka | C08J 5/043 |
| 2018/0079879 A1* | 3/2018 | Otsuki | C08J 5/24 |
| 2019/0194447 A1* | 6/2019 | Oka | C08G 59/20 |
| 2021/0129488 A1* | 5/2021 | Takahashi | B32B 27/281 |

FOREIGN PATENT DOCUMENTS

| | | |
|---|---|---|
| CN | 102582084 A | 7/2012 |
| CN | 106457701 A | 2/2017 |
| TW | 200923154 A | 6/2009 |
| TW | I519696 B | 2/2016 |
| TW | I569949 B | 2/2017 |
| TW | I609900 B | 1/2018 |
| WO | 2009/106868 A1 | 9/2009 |
| WO | 2010062892 A1 | 6/2010 |
| WO | 2010099029 A1 | 9/2010 |
| WO | 2018003691 A1 | 1/2018 |

* cited by examiner

RESIN-BASED COMPOSITE STRUCTURE AND METHOD FOR FORMING RESIN-BASED COMPOSITE STRUCTURE

RELATED APPLICATIONS

This application claims priority to U.S. Provisional Application Ser. No. 62/628,255, filed Feb. 8, 2018, which is herein incorporated by reference.

BACKGROUND

Technical Field

The present disclosure relates to a composite structure and a method for forming the same. More particularly, the present disclosure relates to a resin-based composite structure and a method for forming the same.

Description of Related Art

Epoxy resin-carbon fiber composite materials are widely used in various industries due to its excellent material properties such as light weight, high rigidity and high mechanical strength. Conventionally, a molding and curing process is used for solidifying the epoxy resin-carbon fiber composite materials to form the desired final products (e.g. bicycle frame, bicycle component, vehicle body, etc.). However, surface defects are commonly generated during the molding and curing process of such kind of composite materials. These surface defects will cause unwanted appearance as well as improper functionality of the final product. FIG. 1 shows various surface defects generated on a surface of a prepreg layup 200 manufactured by a conventional molding and curing process. A prepreg layup 200 made of the epoxy resin-carbon fiber composite materials is applied in the conventional molding and curing process, and then a product with various surface defects is formed. These surface defects such as voids 210 and uneven surfaces 220 are generated with the entrapped air between the epoxy resin and the mold tool during the molding and curing process. Furthermore, residual release agents 230 and impurities are also remained, which also may cause pin holes 240 after the molding and curing process. Therefore, defect removing processes such as a sandblasting step, a potting step and a sanding step are required, and then several times of base coat process are needed in order to obtain a uniform surface. However, it is complicated and costly to perform the aforementioned defect removing processes. Another way for removing defects is to prepare an air-venting layer that covered on the surface of the prepreg layup 200 before the molding and curing process. Conventionally a carbon or glass fiber veil is chosen as the material of the air-venting layer. However, appearance defects would be formed and are further difficult to be improved due to high-porosity property which may entrap residual air inside the veil. Another RTM (resin transfer molding) process is also introduced to ensure the smooth surface of the epoxy resin-carbon fiber composite materials. However, excessive content of epoxy resins (about 40%~60%) are required in the RTM process, which also reduce the stiffness, thus it is not favorable for reducing the weight of the structural product (expected content of epoxy resins is about less than 35%). Furthermore, the release agents 230 are required to be applied on the surface of the mold tool used either in the RTM process or in the prepreg layup 200 molding process. A proportion of the release agents 230 will be transferred to the surface of the product during the molding and curing process, thus residual release agents 230 and impurities would be remained on the surface, and chemical or physical removing processes for the residual release agents 230 and the impurities still cannot be omitted and may cause damage of the surface of the product. Therefore, it is needed to develop novel materials or methods that are capable of producing high quality composites surface, requiring fewer release agents 230 and without performing costly defect removing processes.

SUMMARY

According to one aspect of the present disclosure, a method for forming a resin-based composite structure is provided. The method includes: providing a prepreg layup, wherein the prepreg layup includes an epoxy resin-carbon fiber composite material; covering a thermal-fusion material on a surface of the prepreg layup; and performing a molding and curing process to fuse the thermal-fusion material with the prepreg layup. Wherein the molding and curing process includes: heating at a first temperature to melt, soften and fully fuse the thermal-fusion material with the prepreg layup; and heating at a second temperature to solidify the thermal-fusion material for forming the resin-based composite structure. Wherein the first temperature is lower than the second temperature.

According to another aspect of the present disclosure, a resin-based composite structure is provided. The resin-based composite structure includes a prepreg layup and a thermal-fusion material fused with the prepreg layup. The prepreg layup includes an epoxy resin-carbon fiber composite material. The thermal-fusion material is melted, softened and fully fused with the prepreg layup at a first temperature and is solidified at a second temperature thereby forming the resin-based composite structure, and the first temperature is lower than the second temperature.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
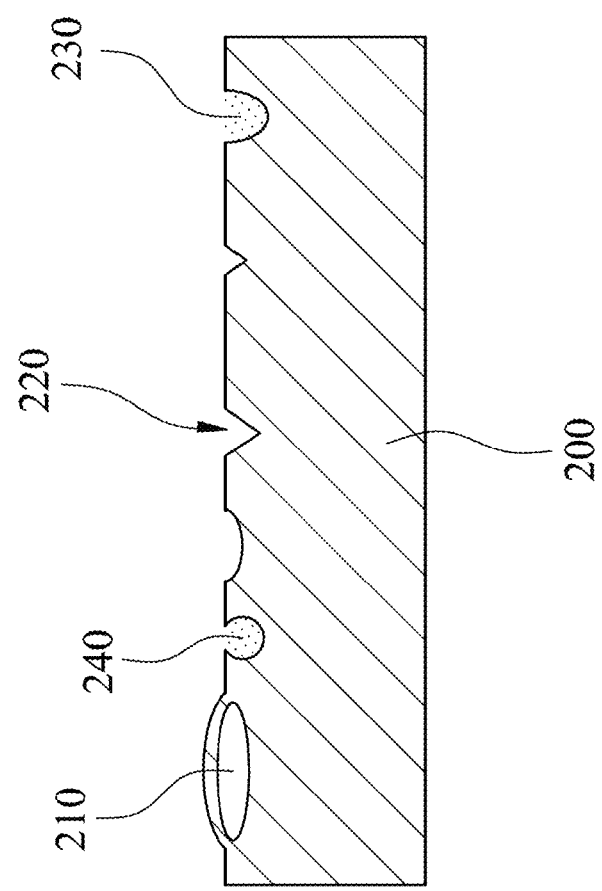
FIG. 1 shows various surface defects generated on a surface of a prepreg layup manufactured by a conventional molding and curing process.
Figure 2A:
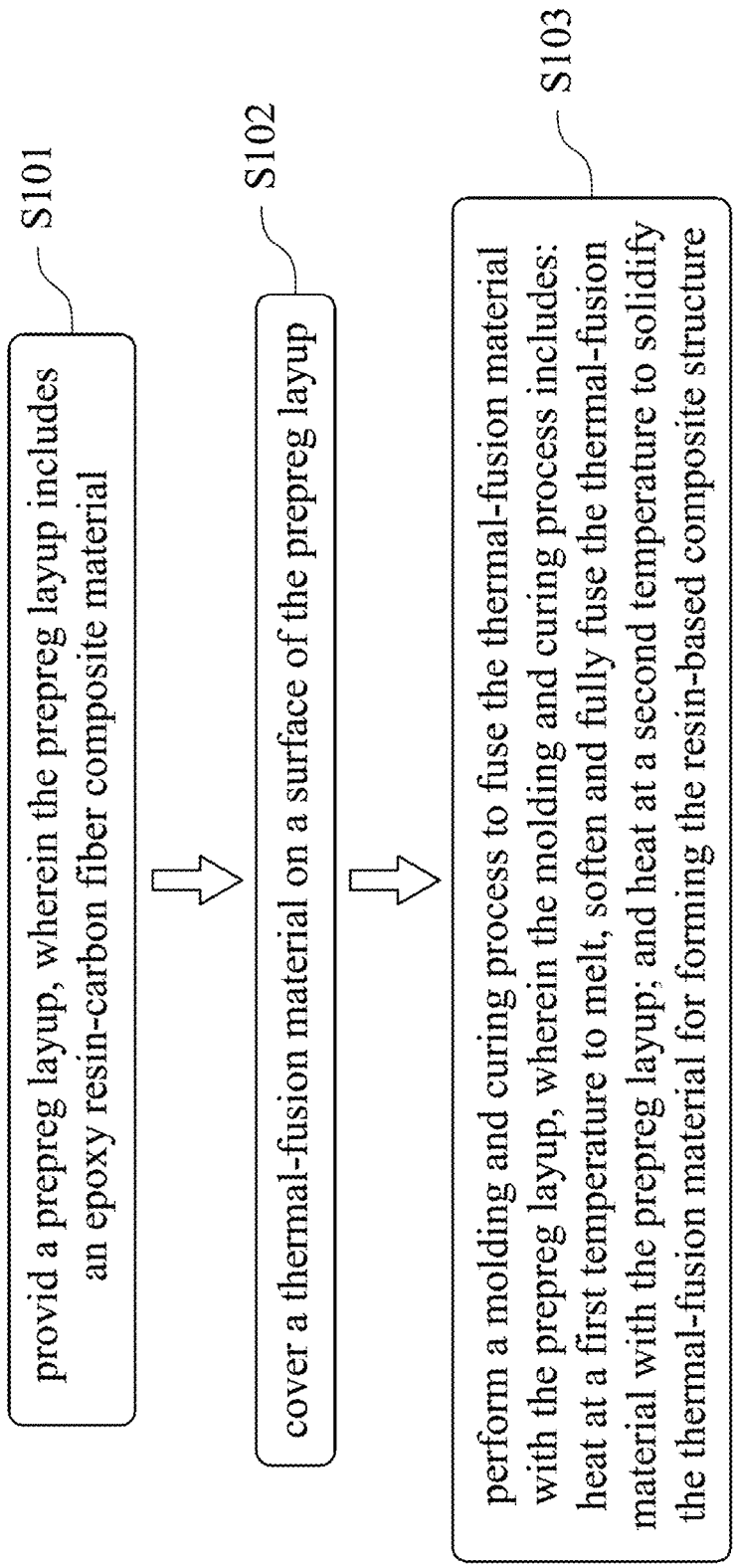
FIG. 2A is a flow chart showing a method for forming a resin-based composite structure according to one embodiment of the present disclosure.

FIG. 2A is a flow chart showing a method for forming a resin-based composite structure according to one embodiment of the present disclosure. The method of FIG. 2A includes: a step S101 for providing a prepreg layup, wherein the prepreg layup includes an epoxy resin-carbon fiber composite material; a step S102 for covering a thermal-fusion material on a surface of the prepreg layup; and a step S103 for performing a molding and curing process to fuse the thermal-fusion material with the prepreg layup, wherein the molding and curing process includes: heating at a first temperature to melt, soften and fully fuse the thermal-fusion material with the prepreg layup; and heating at a second temperature to solidify the thermal-fusion material for forming the resin-based composite structure.

Figure 2B:
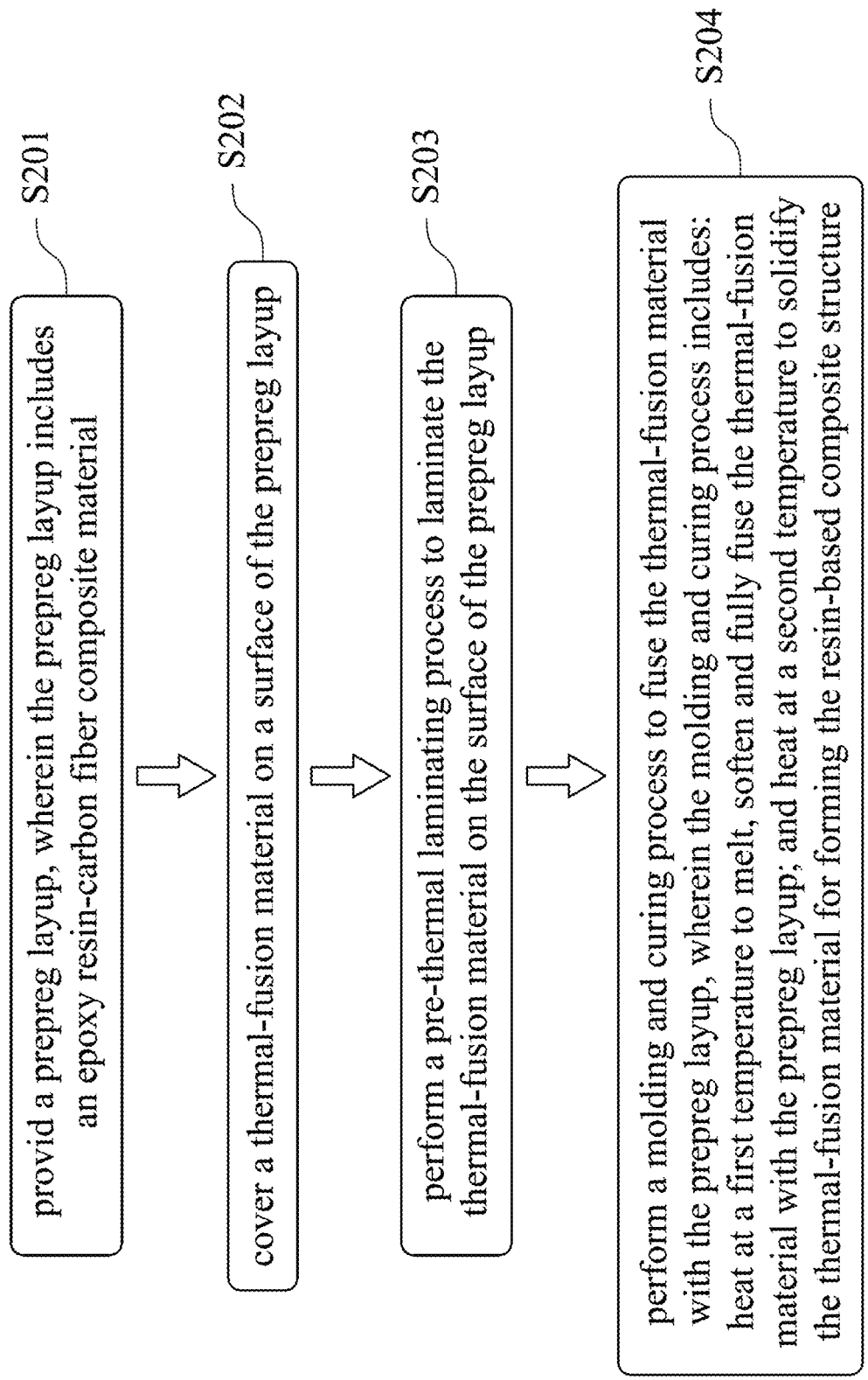
FIG. 2B is a flow chart showing a method for forming a resin-based composite structure according to another embodiment of the present disclosure.

FIG. 2B is a flow chart showing a method for forming a resin-based composite structure according to another embodiment of the present disclosure. The method of FIG. 2B includes: a step S201 for providing a prepreg layup, wherein the prepreg layup includes an epoxy resin-carbon fiber composite material; a step S202 for covering a thermal-fusion material on a surface of the prepreg layup; a Step S203 for performing a pre-thermal laminating process to laminate the thermal-fusion material on the surface of the prepreg layup; and a step S204 for performing a molding and curing process to fuse the thermal-fusion material with the prepreg layup, wherein the molding and curing process includes: heating at a first temperature to melt, soften and fully fuse the thermal-fusion material with the prepreg layup; and heating at a second temperature to solidify the thermal-fusion material for forming the resin-based composite structure. In the method of FIGS. 2A and 2B, the first temperature is lower than the second temperature.

It is an object of the present disclosure to provide a novel material and a novel method for forming a resin-based composite structure. Therefore, the chosen of the material and the process parameters are important and then described in the following paragraphs.

Figure 3:
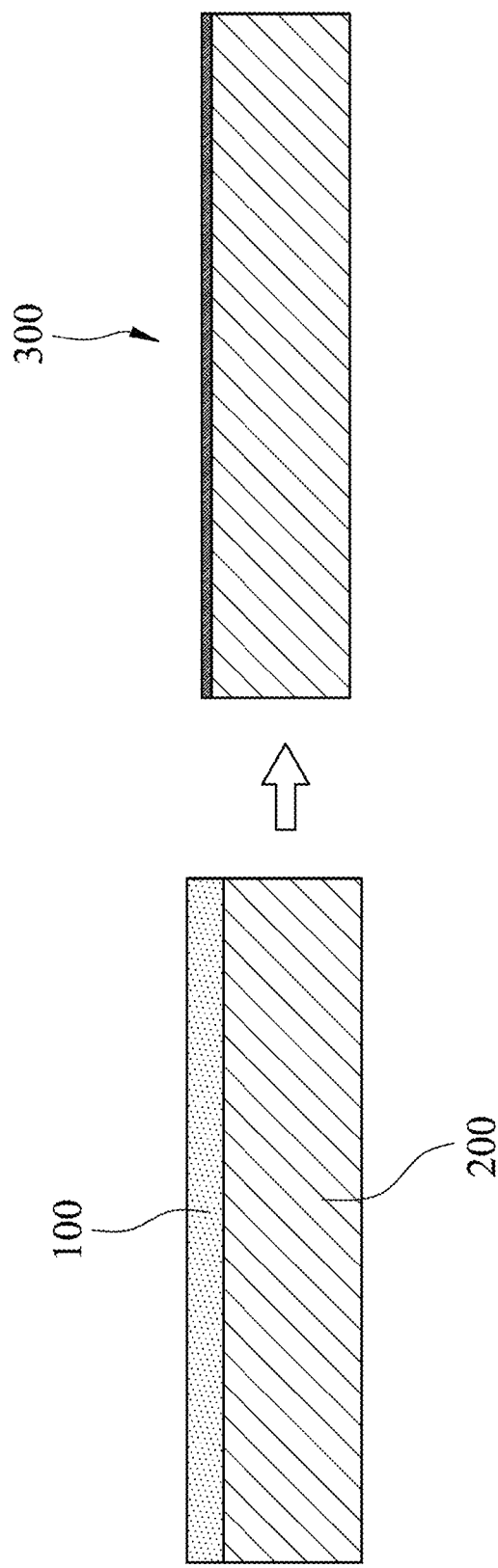
FIG. 3 is a schematic view showing that a resin-based composite structure is formed by fusing the thermal-fusion material with the prepreg layup using the method of FIG. 2A or FIG. 2B.

FIG. 3 is a schematic view showing that a resin-based composite structure 300 is formed by fusing the thermal-fusion material 100 with the prepreg layup 200 using the method of FIG. 2A or FIG. 2B. In FIG. 3, the thermal-fusion material 100 is initially covered on the surface of the prepreg layup 200, and the molding and curing process is performed to fuse the thermal-fusion material 100 with the prepreg layup 200 for forming the resin-based composite structure 300. The resin-based composite structure 300 has a defect-free, resin-rich and smooth surface and requires no extra defect removal processes. In one embodiment, as shown in method of FIG. 2B, a pre-thermal laminating process (the step S203) is preferably performed before performing the molding and curing process (the step S204). In the pre-thermal laminating process, the thermal-fusion material 100 is initially covered on the surface of the prepreg layup 200 and is thermally pre-laminated with the prepreg layup 200, and then the molding and curing process is performed to form the final resin-based composite structure 300. The pre-thermal laminating process is favorable for removing the entrapped air during the molding and curing process. Therefore, a more saturated and defect-free appearance of the resin-based composite structure 300 can be obtained. Furthermore, in the method of FIG. 2A or FIG. 2B, by controlling the process parameters of the thermal-fusion material 100, the material properties of the resin-based composite structure 300 can also be precisely controlled. For example, an air permeability of the resin-based composite structure 300 can be controlled by controlling a ratio of the thermal-fusion material 100 impregnated with an epoxy resin of the prepreg layup 200. Furthermore, a hardness of the resin-based composite structure 300 can also be controlled by controlling a thickness of the thermal-fusion material 100. In a thin thickness (areal weight ranged from 5 to 30 $g/m^2$), higher hardness of the surface of the resin-based composite structure 300 can be obtained.

Figure 4A:
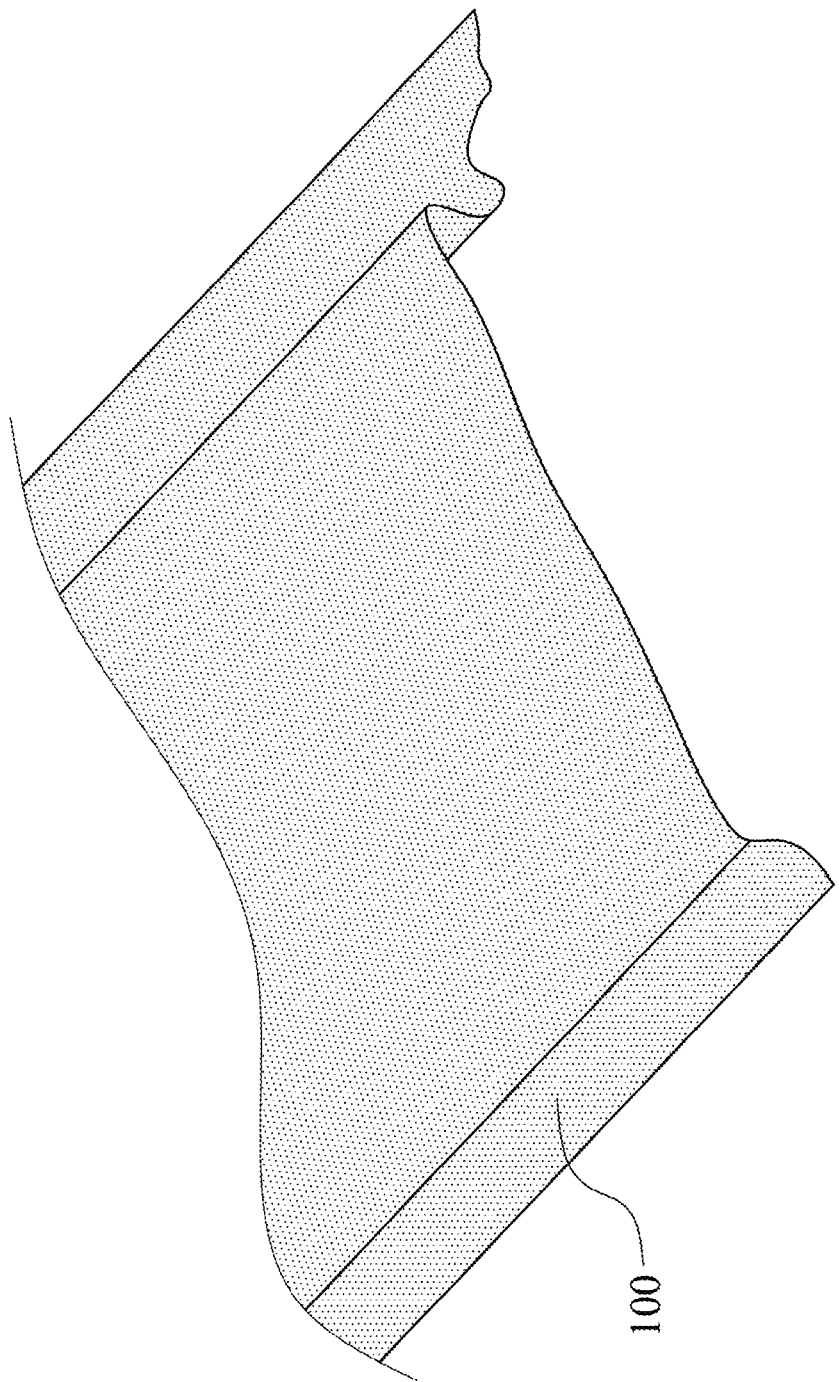
FIG. 4A is a schematic view showing a structure of a thermal-fusion material used in the method of FIG. 2A or FIG. 2B.
Figure 4B:
FIG. 4B is a micrographic view showing the structure of the thermal-fusion material of FIG. 4A.

FIG. 4A is a schematic view showing a structure of a thermal-fusion material 100 used in the method of FIG. 2A or FIG. 2B; FIG. 4B is a micrographic view showing the structure of the thermal-fusion material 100 of FIG. 4A. Covering an air-venting layer on a surface of an epoxy resin-carbon fiber composite material (prepreg layup 200) may be a solution to release the entrapped air during the molding and curing process while forming the resin-based composite structure 300. However, it is difficult to choose suitable material nowadays. In the present disclosure, a novel thermal-fusion material 100 functioned as the air-venting layer is described. The thermal-fusion material 100 is a kind of resin-based polymer compound. The thermal-fusion material 100 is in a solid state at a room temperature, transferred from the solid state to a gel state after the first temperature and transferred from the gel state to the solid state after the second temperature. Furthermore, a viscosity of the thermal-fusion material 100 is decreased while raised from the first temperature to the second temperature. The first temperature can be ranged from 70 degrees Celsius to 150 degrees Celsius; preferably ranged from 70 degrees Celsius to 100 degrees Celsius. The second temperature can be ranged from 120 degrees Celsius to 180 degrees Celsius. In other words, during the molding and curing process, the thermal-fusion material 100 is heated from the solid state into the gel state before the epoxy resin of the prepreg layup 200 start curing, normally between 70 degrees Celsius to 100 degrees Celsius, and then the thermal-fusion material 100 is merged with the prepreg layup 200 during the molding and curing process. The viscosity of the thermal-fusion material 100 is decreased while raised from the first temperature to the second temperature in order to fully fuse the thermal-fusion material 100 with the prepreg layup 200 before the solidification of the final resin-based composite structure 300. Therefore, the first temperature must be controlled to be lower than the second temperature. Accordingly, particular material properties of the thermal-fusion material 100 should be carefully selected. The details of the material properties of the thermal-fusion material 100 of the present disclosure will be described in the following paragraphs. Therefore, resin-based thermoplastic materials with low melting point (60° C.~120° C.) such as CoPA (copolymer of PA and others), CoPES (copolymer of Polyester and others), Phenoxy or other polyether materials with proper glass transition temperature (70° C.~100° C.) may be suitable chosen as a base material of the thermal-fusion material 100. Furthermore, thinner thickness or light-weight of the thermal-fusion material 100 can be strongly fused or cross-linked with the epoxy-resin based prepreg layup 200 by the curing agent thereof, thereby obtaining a high hardness surface.

In FIG. 4A, it is shown that the thermal-fusion material 100 has flexibility and can be fitted with a curved surface of the prepreg layup 200 to further reduce the entrapped air between it and the prepreg layup 200. In FIG. 4B, veil-like surface morphology of the thermal-fusion material 100 can be observed. It should be mentioned that the surface morphology of the thermal-fusion material 100 is not limited. The thermal-fusion material 100 can have the structure similar as a woven fabric, a non-woven or a thin-film. A specified ratio (e.g. 50% etc.) of chopped fiber composite materials can be mixed with the thermal-fusion material 100 to form the non-woven. The chopped fiber composite materials can be made of a carbon fiber or a glass fiber. The chopped fiber composite material is favorable for smoothly adhering the thermal-fusion material 100 on a complicated surface (e.g. a curved surface) due to its flexibility. After performing the molding and curing process, the thermal-fusion material 100 can form a uniform cover layer on the surface of the prepreg layup 200. The thickness of the thermal-fusion material 100 is uniform and can be ranged from 5 μm to 100 μm. Owing to the particular material properties, the thermal-fusion material 100 can be highly fused with the epoxy resin-carbon fiber composite materials after performing the molding and curing process and without interface separation. Therefore, the carbon fiber underneath will not be exposed, and a good appearance will be obtained. Moreover, the surface is natively defect-free, thus the conventional defect removing processes such as the sandblasting step, the potting step and the sanding step are not required. Furthermore, conventional epoxy resin-carbon fiber composite materials (prepreg layup 200) will have high tack in the molding and curing temperature range, there is strong chemical adhesion between the epoxy resin-carbon fiber composite materials and the metal mold tool, therefore the release agents 230 are required to prevent the improper adhesion when releasing the cured product from the mold tool. However, the residual release agent 230 is a common issue of the molding and curing process of the epoxy resin-carbon fiber composite materials. The thermal-fusion material 100 is a high molecular weight thermoplastic material. It remains in a solid state without tack at the room temperature, and there is no chemical adhesion during the aforementioned molding and curing temperature, therefore little or even no release agent 230 is required.

Figure 5:
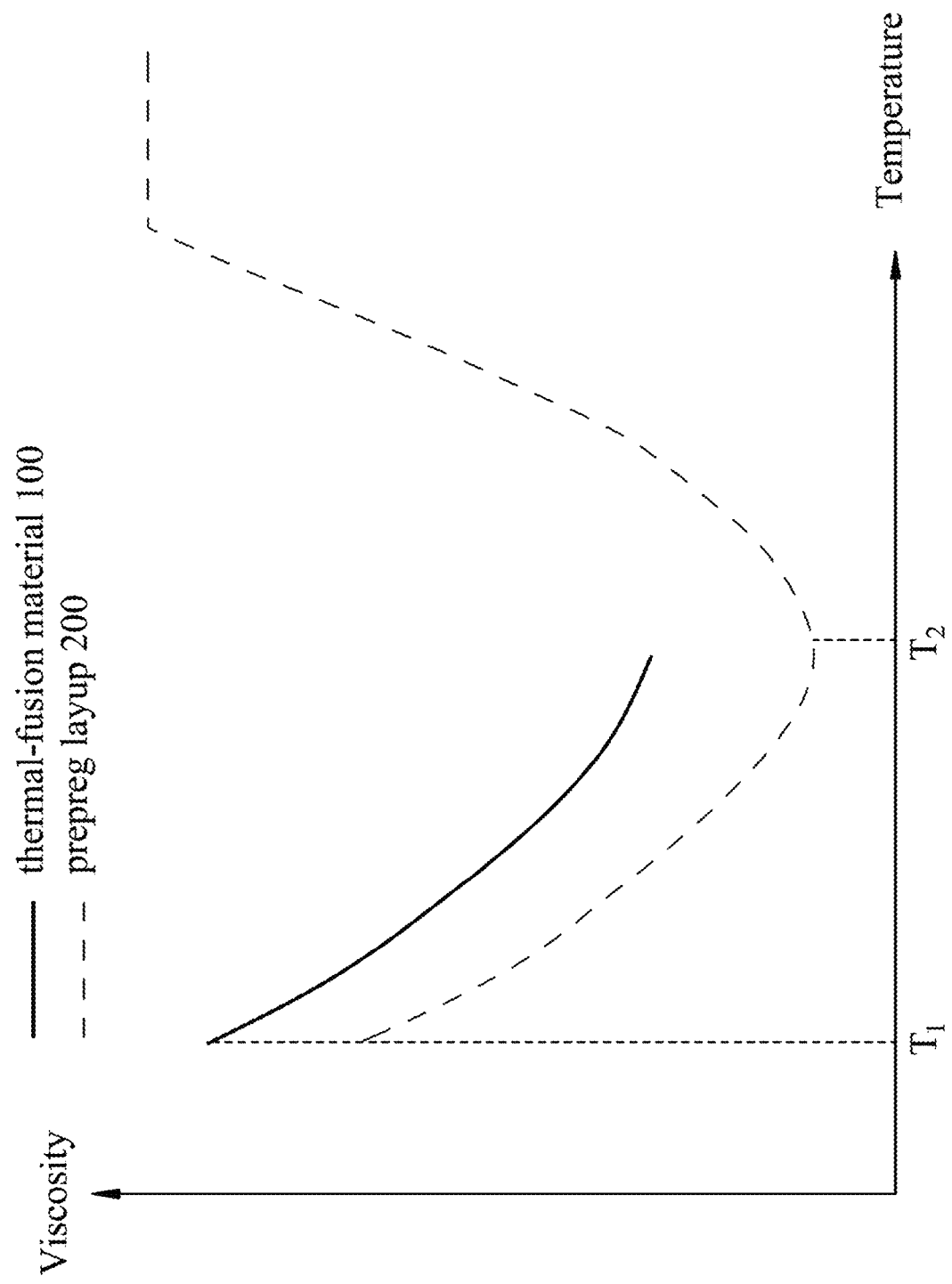
FIG. 5 is a comparison diagram showing that viscosity of the thermal-fusion material and the prepreg layup varied with temperature during the molding and curing process.

FIG. 5 is a comparison diagram showing that viscosity of the thermal-fusion material 100 and the prepreg layup 200 varied with temperature during the molding and curing process. While raised from the room temperature (normally 25° C.) to the first temperature $T_1$, the thermal-fusion material 100 remains in a solid state, tack-free and high air permeability condition. The sufficient low tack of the thermal-fusion material 100 is favorable for preventing the thermal-fusion material 100 from adhered with the mold tool during the molding and curing process. Furthermore, the solid state and high air permeability of the thermal-fusion material 100 is favorable for removing the entrapped air when fusing the thermal-fusion material 100 with the prepreg layup 200 during the molding and curing process. The first temperature $T_1$ is a melting temperature or a glass transition temperature of the thermal-fusion material 100. The first temperature $T_1$ can be ranged from 70° C. to 150° C.; preferably ranged from 70° C. to 100° C., depending on the material used. After the first temperature $T_1$, the thermal-fusion material 100 is started to be melted and softened and gradually transferred from the solid state to a gel state. While raised from the first temperature $T_1$ to the second temperature $T_2$, the viscosity of the thermal-fusion material 100 is decreased continuously with the increasing temperature, and reaches a minimum value at the second temperature $T_2$. The temperature $T_2$ is a solidification temperature of the prepreg layup 200, and can be ranged from 120 degrees Celsius to 180 degrees Celsius, depending on the material used. From the temperature $T_1$ to the temperature $T_2$, the viscosity of the prepreg layup 200 is also decreased, therefore the decrease of the viscosity of the thermal-fusion material 100 during this temperature range is favorable for the fully fusion of the thermal-fusion material 100 with the prepreg layup 200. Therefore, before the second temperature $T_2$, the thermal-fusion material 100 is fully fused with the prepreg layup 200. After the temperature $T_2$, the thermal-fusion material 100 and the prepreg layup 200 are already fully fused and the composite structure is started to be solidified. In other words, after the temperature $T_2$, the thermal-fusion material 100 is transferred from the gel state to the solid state. Finally, the resin-based composite structure 300 is formed after a period of solidification time. Due to the particular material properties of the thermal-fusion material 100 of the present disclosure, the formed resin-based composite structure 300 has a defect-free and smooth appearance after the solidification process without requiring other followed defect removing processes.

Figure 6A:
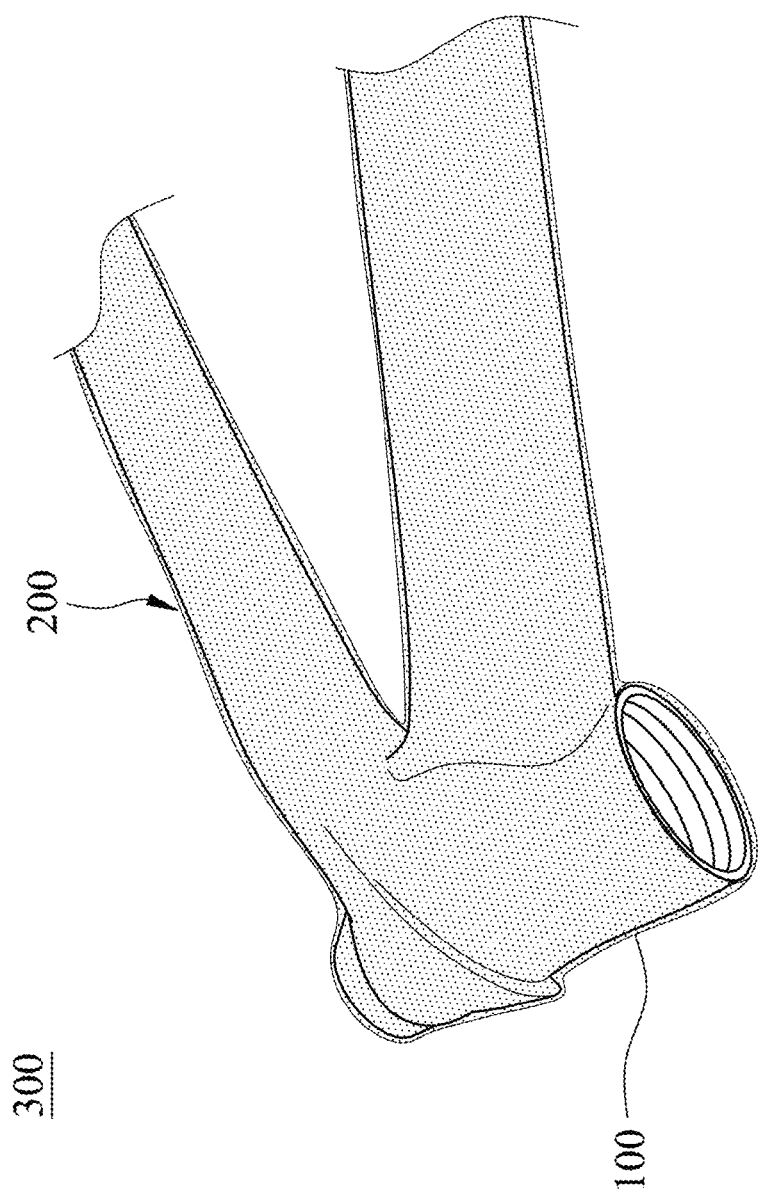
FIG. 6A is a schematic view showing an appearance of a bicycle frame manufactured by using a resin-based composite structure before performing a molding and curing process.
Figure 6B:
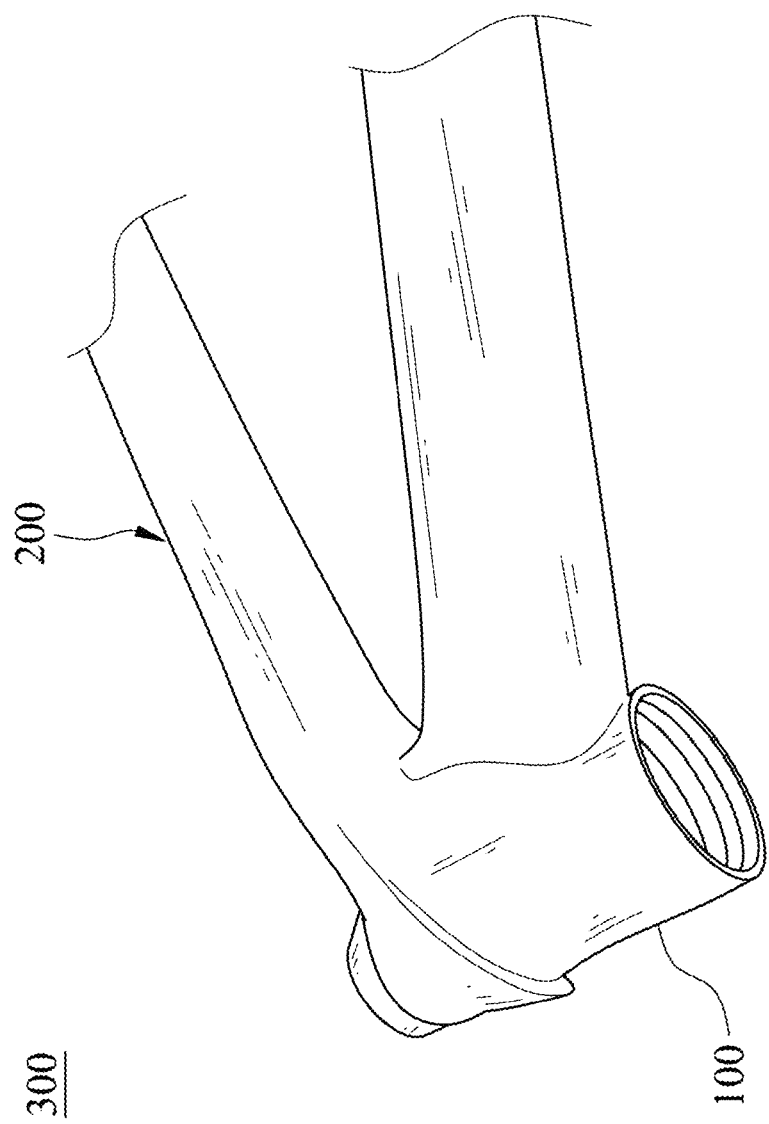
FIG. 6B is a schematic view showing an appearance of the bicycle frame of FIG. 6A after performing the molding and curing process.

FIG. 6A is a schematic view showing an appearance of a bicycle frame manufactured by using a resin-based composite structure 300 before performing a molding and curing process. FIG. 6B is a schematic view showing an appearance of the bicycle frame of FIG. 6A after performing the molding and curing process. FIGS. 6A and 6B show a real application case of the resin-based composite structure 300 of FIG. 3. In FIG. 6A, the thermal-fusion material 100 is initially covered on a surface of a bicycle frame made of uncured prepreg layup 200 before performing the molding and curing process. In FIG. 6B, the thermal-fusion material 100 is fused with the prepreg layup 200 thereby forming the resin-based composite structure 300 to form the bicycle frame after performing the molding and curing process. The material properties of the thermal-fusion material 100 is changed thereby a defect-free, smooth and high quality surface of the bicycle frame is formed after the molding and curing process. It should be mentioned that other components of a bicycle can also be manufactured by using the resin-based composite structure 300 of the present disclosure. While applying the thermal-fusion material 100 in combination with the epoxy resin-carbon fiber composite materials, excellent stiffness-to-weight ratio, smooth appearance and high durability will be obtained. It should be mentioned that the use of the thermal-fusion material 100 of the present disclosure in the manufacturing the resin-based composite structure 300 of the bicycle frame and components is never seen before.

Figure 7A:
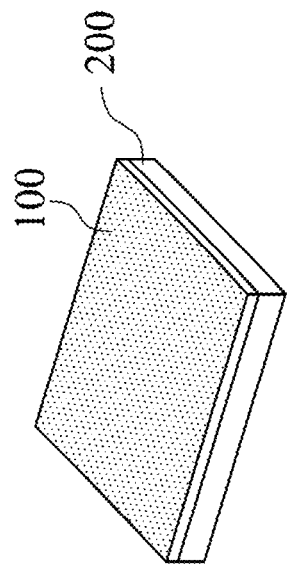
FIG. 7A is a schematic view showing that a carbon veil covered on the prepreg layup before performing a molding and curing process.
Figure 7C:
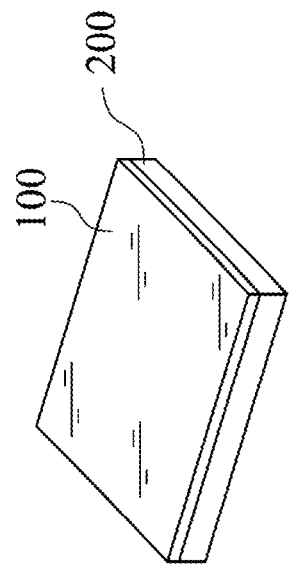
FIG. 7C is a schematic view showing that a thermal-fusion material of the present disclosure covered on the prepreg layup before performing the molding and curing process.
Figure 7B:
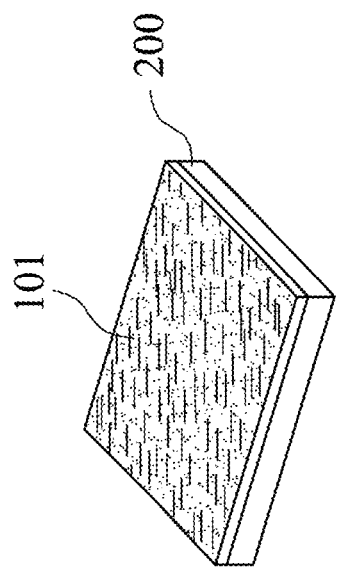
FIG. 7B is a schematic view showing that the carbon veil of FIG. 7A fused with the prepreg layup after performing the molding and curing process.
Figure 7D:
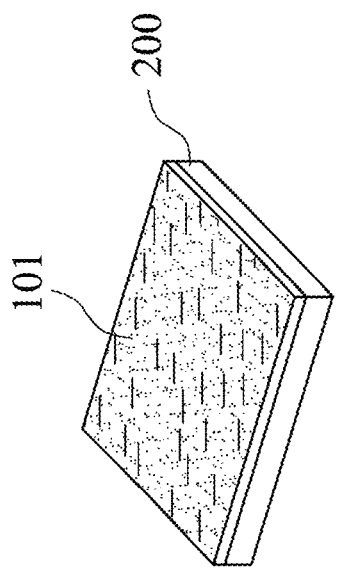
FIG. 7D is a schematic view showing that the thermal-fusion material of FIG. 7C fused with the prepreg layup after performing the molding and curing process.

FIG. 7A is a schematic view showing that a carbon veil 101 covered on the prepreg layup 200 before performing a molding and curing process. FIG. 7B is a schematic view showing that the carbon veil 101 of FIG. 7A fused with the prepreg layup 200 after performing the molding and curing process. FIG. 7C is a schematic view showing that a thermal-fusion material 100 of the present disclosure covered on the prepreg layup 200 before performing the molding and curing process. FIG. 7D is a schematic view showing that the thermal-fusion material 100 of FIG. 7C fused with the prepreg layup 200 after performing the molding and curing process. FIGS. 7A to 7D show a comparison of an appearance before and after the molding and curing process when applying conventional carbon veil 101 and the thermal-fusion material 100 functioned as air-venting layers on the prepreg layup 200. In FIG. 7A, a conventional carbon veil 101 is covered on the prepreg layup 200. In FIG. 7B, after the molding and curing process, the structure may have acceptable air permeability, however, a surface with defects (white spots) is formed due to the un-releasable entrapped air in the carbon veil 101 itself during the molding and curing process. In FIG. 7C, the thermal-fusion material 100 of the present disclosure is initially covered on the prepreg layup 200 before the molding and curing process. In FIG. 7D, after performing the molding and curing process, a defect-free surface can be obtained due to the full fusion between the thermal-fusion material 100 and the prepreg layup 200.

In sum, it is an object of the present disclosure to provide a new use of the thermal-fusion material 100 to form the resin-based composite structure 300. Due to the particular materiel properties of the thermal-fusion material 100, when applying the resin-based composite structure 300 in the bicycle manufacturing industry, light-weighted products (e.g. bicycle frame, bicycle components, etc.) with high mechanical strength, high durability and excellent appearance can be produced.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A method for forming a resin-based composite structure, the method comprising:
providing a prepreg layup, wherein the prepreg layup comprises an epoxy resin-carbon fiber composite material;
covering a thermal-fusion material on a surface of the prepreg layup; and
performing a molding and curing process to fuse the thermal-fusion material with the prepreg layup, wherein the prepreg layup and the thermal-fusion material are in a solid state at a room temperature, the thermal-fusion material is tack-free at the room temperature, and the molding and curing process comprises:
heating the prepreg layup and the thermal-fusion material, wherein the prepreg layup and the thermal-fusion material are heated up from the room temperature to a first temperature, the thermal-fusion material remains in the solid state and tack-free before the first temperature, then the thermal-fusion material is heated at the first temperature to melt, soften and fuse with the prepreg layup, and the prepreg layup and the thermal-fusion material are transferred from the solid state to a gel state after the first temperature; and
heating at a second temperature to solidify the prepreg layup and the thermal-fusion material for forming the resin-based composite structure, wherein the prepreg layup and the thermal-fusion material are fully fused with each other before the second temperature, and the prepreg layup fully fused with the thermal-fusion material are transferred from the gel state to the solid state after the second temperature;
wherein the first temperature is lower than the second temperature.

2. The method of claim 1, wherein the first temperature is ranged from 70 degrees Celsius to 150 degrees Celsius.

3. The method of claim 1, wherein the second temperature is ranged from 120 degrees Celsius to 180 degrees Celsius.

4. The method of claim 1, wherein a viscosity of the thermal-fusion material is decreased while raised from the first temperature to the second temperature.

5. The method of claim 1, further comprising:
performing a pre-thermal laminating process to laminate the thermal-fusion material on the surface of the prepreg layup before the molding and curing process.

6. The method of claim 1, further comprising:
controlling a ratio of the thermal-fusion material impregnated with an epoxy resin of the prepreg layup for controlling an air permeability of the resin-based composite structure.

7. The method of claim 1, further comprising:
controlling a thickness of the thermal-fusion material for controlling a hardness of the resin-based composite structure.

8. The method of claim 7, wherein the thickness of the thermal-fusion material is controlled at an areal weight ranged from 5 to 30 $g/m^2$ for increasing the hardness of the resin-based composite structure.

9. The method of claim 1, wherein the thermal-fusion material is made of a resin-based polymer compound.

10. The method of claim 1, wherein the thermal-fusion material is made of a CoPA, a CoPES or a Phenoxy.

11. The method of claim 1, further comprising:
forming a bicycle frame or components of a bicycle by utilizing the resin-based composite structure.

12. A resin-based composite structure, comprising:
a prepreg layup, wherein the prepreg layup comprises an epoxy resin-carbon fiber composite material; and
a thermal-fusion material fused with the prepreg layup;
wherein the prepreg layup and the thermal-fusion material are in a solid state at a room temperature, the thermal-fusion material is tack-free at the room temperature, the thermal-fusion material is heated to melt, soften and transfer from the solid state to a gel state so as to start to fuse with the prepreg layup at a first temperature, and then the prepreg layup fully fused with the thermal-fusion material start to transfer from the gel state to the solid state at a second temperature thereby forming the resin-based composite structure, and the first temperature is lower than the second temperature;
wherein the thermal-fusion material remains in the solid state and tack-free before the first temperature, the prepreg layup and the thermal-fusion material are fully fused with each other before the second temperature, the prepreg layup fully fused with the thermal-fusion material are transferred from the gel state to the solid state after the second temperature, and finally the resin-based composite structure is in the solid state.

13. The resin-based composite structure of claim 12, wherein the thermal-fusion material is made of a resin-based polymer compound.

14. The resin-based composite structure of claim 12, wherein the thermal-fusion material is made of a CoPA, a CoPES or a Phenoxy.

15. The resin-based composite structure of claim 12, wherein the thermal-fusion material is in a structure of a non-woven, a woven or a thin film.

16. The resin-based composite structure of claim 15, wherein a chopped fiber composite material is mixed with the thermal-fusion material to form the non-woven.

17. The resin-based composite structure of claim 12, wherein the thermal-fusion material is made of a thermoplastic material.

18. The resin-based composite structure of claim 12, wherein a viscosity of the thermal-fusion material is decreased while raised from the first temperature to the second temperature.

* * * * *